Aug. 30, 1938.  C. SCHLOSSER, JR  2,128,477
CONSTANT MESH VARIABLE SPEED GEAR DRIVE
Filed May 28, 1937  3 Sheets-Sheet 1

Inventor
Chalmer Schlosser Jr.
By Minturn & Minturn,
Attorneys

Inventor
Chalmer Schlosser Jr.
By Minturn & Minturn,
Attorneys

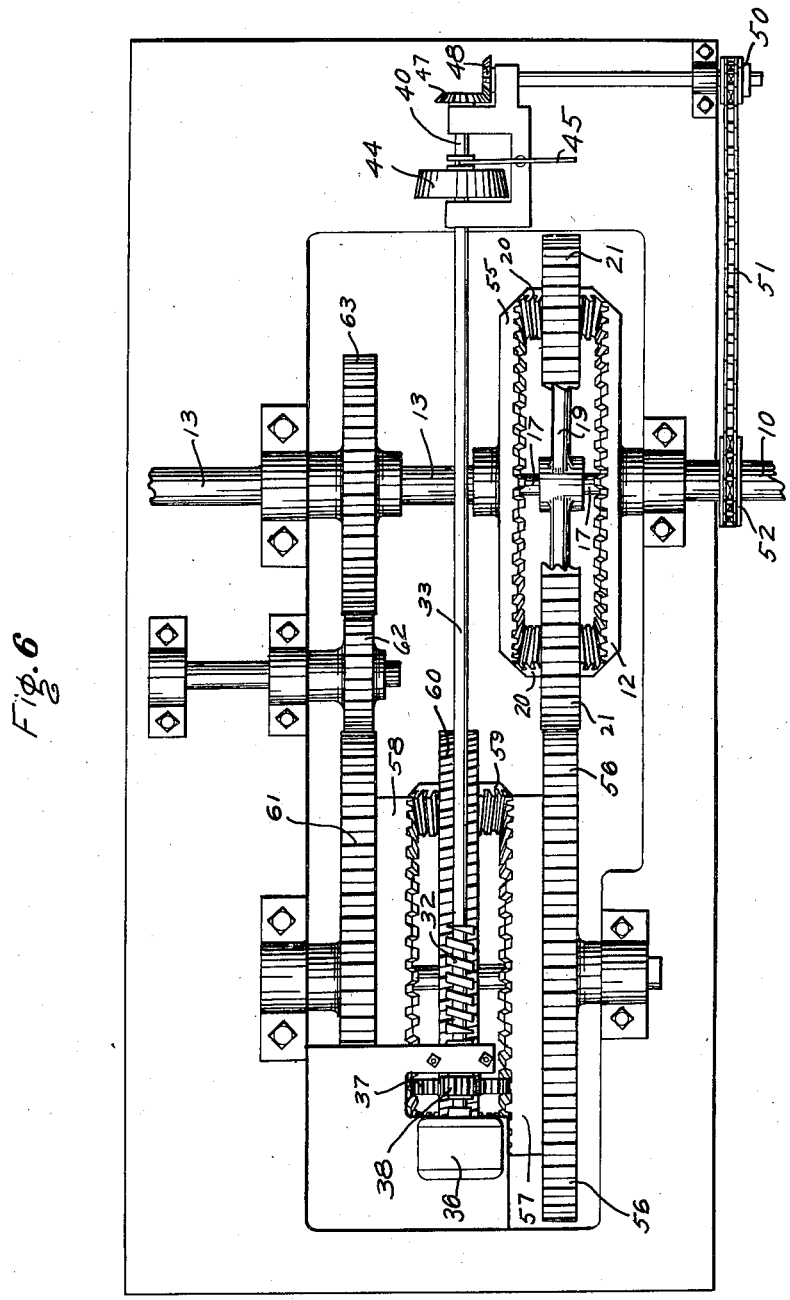

Patented Aug. 30, 1938

2,128,477

UNITED STATES PATENT OFFICE 2,128,477

CONSTANT MESH VARIABLE SPEED GEAR DRIVE

Chalmer Schlosser, Jr., Indianapolis, Ind.

Application May 28, 1937, Serial No. 145,169

15 Claims. (Cl. 74—282)

This invention relates to a constant mesh variable speed transmission unit to be employed between a source of power and a device operated by that power. It has for a primary object an automatically variable gear ratio between the driven object and the source of power depending principally upon the rate of speed of the power input driving member operating in conjunction with a control device.

Figure 1:
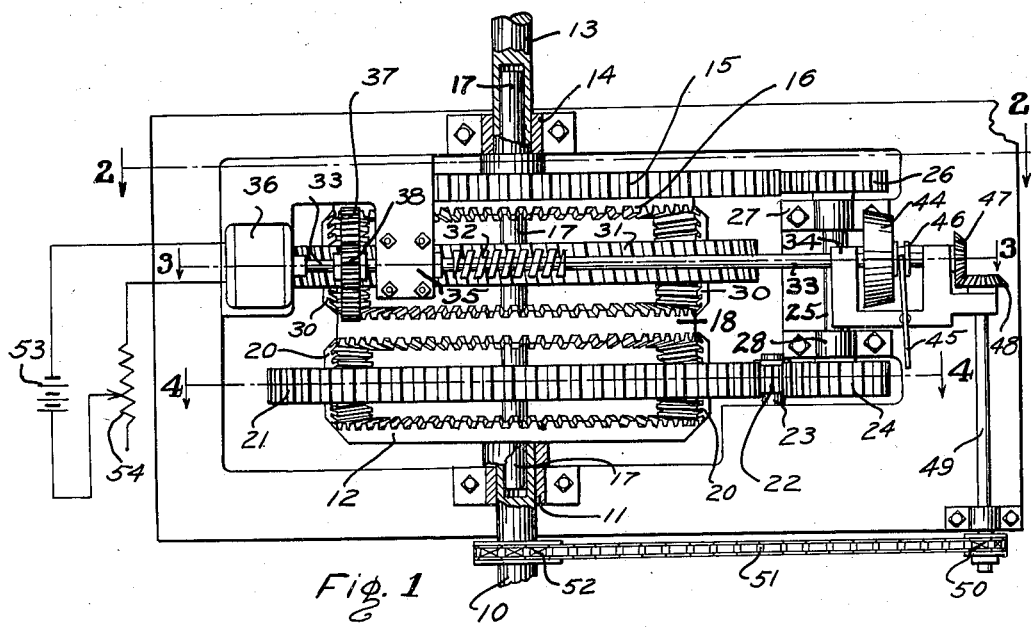
Figure 2:
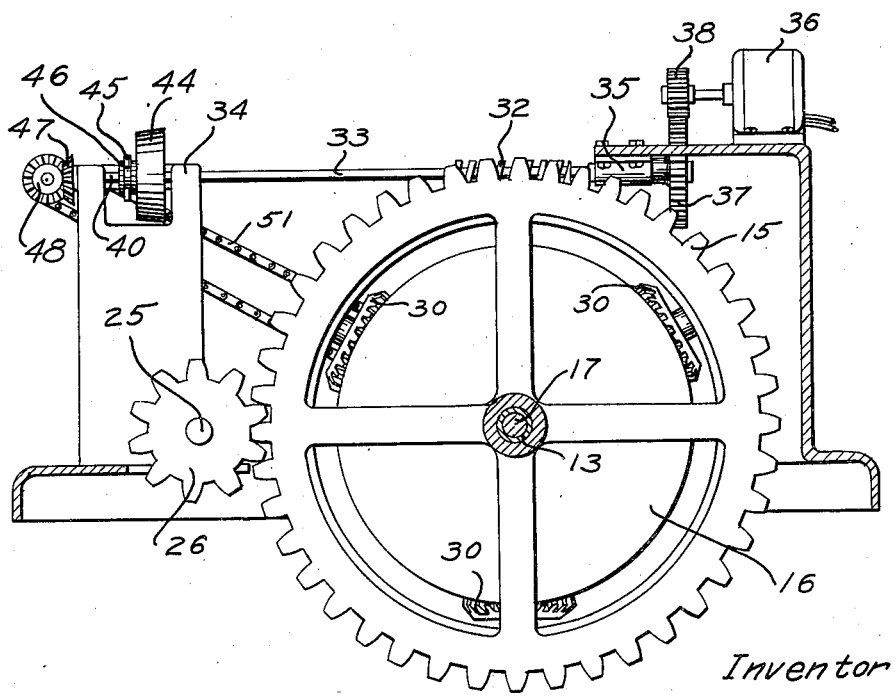
Figure 4:
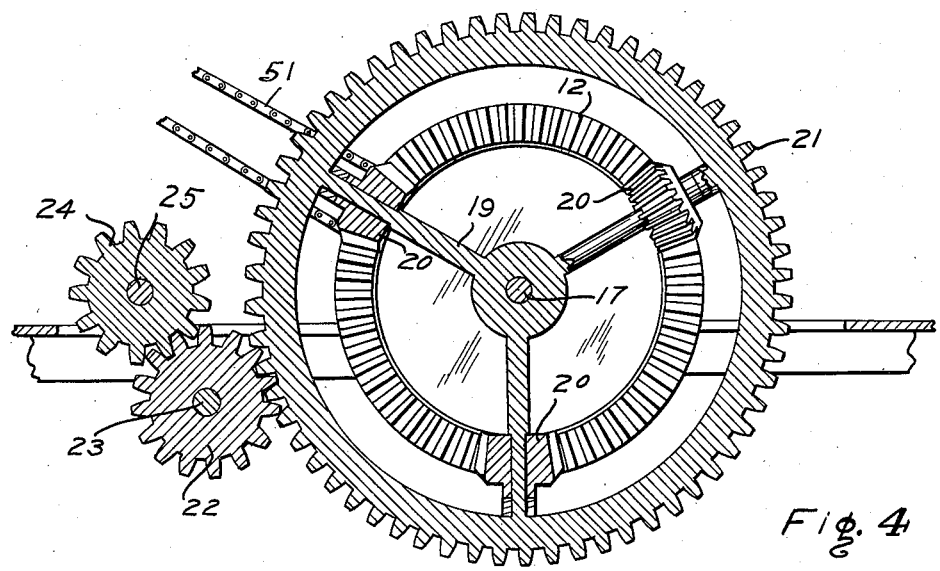
Figure 3:
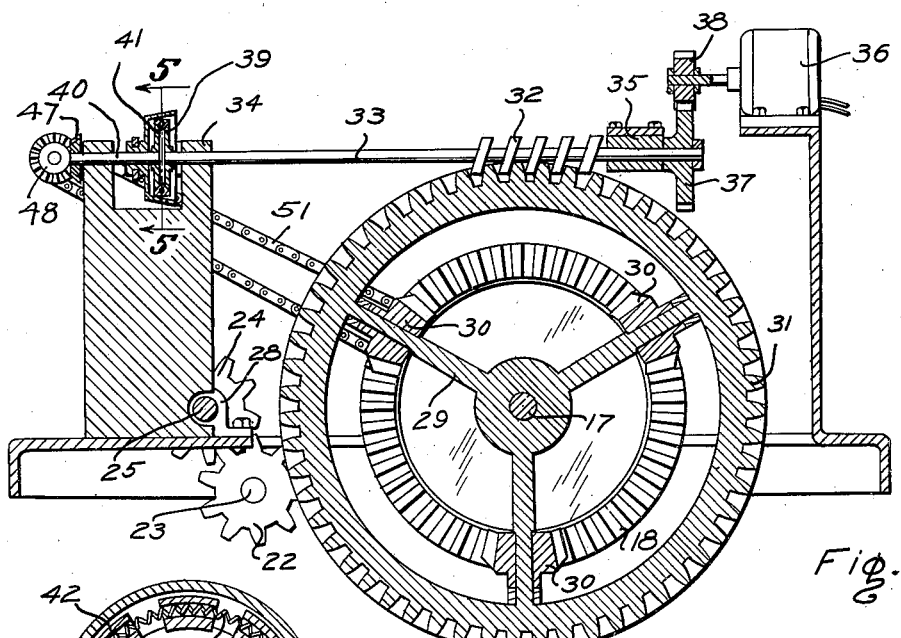
Figure 5:
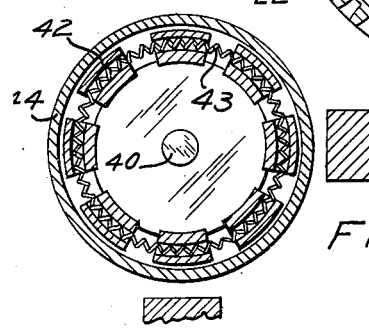

A further important object of the invention resides in its extreme simplicity and adaptability to a wide range of uses. These and further objects and advantages will become apparent to those skilled in the art in the following description of the invention as more or less diagrammatically illustrated in the accompanying drawings, in which:

Fig. 1 is a top plan view of a structure embodying the invention;

Fig. 2, a vertical transverse section on the line 2—2 in Fig. 1;

Fig. 3, a vertical transverse section on the line 3—3 in Fig. 1;

Fig. 4, a vertical transverse section on the line 4—4 in Fig. 1;

Fig. 5, a detailed section on the line 5—5 of Fig. 3 through a control clutch, and Fig. 6, a top plan view of a modified form of the invention.

Like characters of reference indicate like parts throughout the several views in the drawings.

A power shaft 10 is revolubly mounted in any suitable manner, here shown as in the bearing block 11 and carries a bevel gear 12 in fixed relation thereon. In axial alignment with the shaft 10 is a driving shaft 13 likewise suitably revolubly mounted, here shown as through the bearing block 14. The shaft 13 has a spur gear 15 fixed thereto and on that face of the gear 15 directed toward the gear 12 is a bevel gear 16 carried in fixed relation with the gear 15, the gears 12 and 16 being spaced apart one from the other. An idler shaft 17 is carried between the opposing ends of shafts 10 and 13, here shown as entering into bores in the respective shaft ends.

Mounted on the shaft 17 is a wheel 18 having teeth cut on both sides thereof to form in effect a bevel gear opposing but spaced from the gear 12 on the one side and spaced from and opposing the gear 16 on the other side. The wheel 18 is of the same effective diameter as that of both the wheels 12 and 16 and carries the same number of teeth on each of its sides as do the representative wheels 12 and 16. The wheel 18 is mounted on the shaft 17 to be revoluble freely independent of either the gear 12 or the gear 16.

A spider 19 is mounted on the shaft 17 between the gear 12 and the wheel 18 to be freely revoluble therearound. In the form herein shown, this spider 19 carries three arms, on each of which arms is mounted a small bevel gear 20 of the proper diameter and tooth formation to be in constant mesh with the opposing teeth of the gear 12 and the wheel 18. In other words the gear 12, wheel 18, and the intermediate gears 20 form a differential gearing. The spider 19 has its arms extending on through the gears 20 to carry a spur gear 21 concentric with the gear 12 and wheel 18, the gear 21 having a larger diameter than that of the gear 12.

This gear 21, Fig. 4, is in constant mesh with an intermediate pinion gear 22 which is mounted on a stub shaft 23. The gear 22 in turn is in constant mesh with a gear 24 which is fixed on a jack shaft 25 which extends parallel to the shaft 17 to have a gear 26 fixed on its other end and in constant mesh with the gear 15. The shaft 25 is revolubly supported by any suitable means such as by the bearing blocks 27 and 28 in the form shown, Fig. 1.

Between the wheel 18 and the bevel gear 16 is a spider 29, Fig. 3, revolubly mounted on the shaft 17, to carry revolubly on each of its arms, here shown as three in number, a bevel gear 30 each in constant mesh with the teeth of the wheel 18 and of the gear 16 thereby forming a second differential gearing with the wheel 18 in common with both sets. The arms of the spider 29 extend on through and beyond the gears 30 to carry a worm wheel 31 concentrically of the shaft 17. In constant mesh with the teeth of the wheel 31 is a worm 32 mounted on a transverse shaft 33, the shaft 33 being revolubly carried between the bearing blocks 34 and 35, Fig. 3.

One end of the shaft 33 is interconnected in driving relation with an electric motor 36 here shown as through the reduction gears 37 and 38, these gears being adjacent the bearing block 35. On the other end of the shaft 33 adjacent the bearing block 34 is fixed a clutch plate 39. A stub shaft 40 is mounted in axial alignment with the shaft 33 and carries in fixed relation thereon a clutch plate 41 adjacent the clutch plate 39 and separated therefrom. Normally, the shafts 33 and 40 are interconnected in driving relation initially by friction blocks 42, Figs. 3 and 5, normally pressed between beveled edges of the plates 39 and 41 by a tension spring 43. When the combination of shafts 33 and 40 reach a predetermined speed, the driving connection therebetween afforded by these blocks 42 is interrupted by reason of the centrifugal effect throwing the blocks 42 outwardly in opposition to the pull of the spring 43 sufficiently to relieve the frictional engagement of these blocks 42 between the two plates 39 and 41. When this disconnection between the shafts 33 and 40 is not desired, such for example as when the invention may be employed in an automobile and the engine is being initially set in motion, the clutch blocks 42 are maintained in frictional engagement with the two plates in spite of centrifugal effort tending to remove them. This result is obtained in any suitable manner, one such method being herein shown as by surrounding the ring of weights 42 by a conical drum 44 in such manner that the drum may be shifted longitudinally of one of the shafts, herein shown as of the shaft 40, whereby upon shifting the drum away from the plates, the blocks 42 are permitted to be freely acted upon by centrifugal force and when the drum is shifted toward the plates, the interior wall of the drum comes into contact with the outer sides of the block 42 and thereby prevents movement outwardly of the blocks. This shifting of the drum 44 may be accomplished in any suitable manner, one such method of operation being by a simple lever 45, Fig. 1, having an end engaging within a collar 46 extending from the drum 44.

The stub shaft 40 is connected in driving relation with the shaft 10 by any suitable means, here shown as by a bevel gear 47 meshing with a bevel gear 48 on a shaft 49 which in turn carries a sprocket 50 about which passes a chain 51 driven by a sprocket 52 secured on the shaft 10. Therefore, it can be seen that when power is initially applied to the shaft 10, the shaft 33 and consequently the worm 32, will be revolved to in turn revolve the worm wheel 31. With the proper speed ratio between the shaft 10 and the worm wheel 31, obtained through the interconnecting members above described, power may be initially applied to the shaft 10 to permit the shaft 13 to remain stationary as would be desirable in the case of starting an engine in an automobile so that the engine could be set in operation such as at idling speeds before power therefrom is applied to the driving wheels. So far in the foregoing description the electric motor 36 has not been set in operation and the initial application of power to the shaft 10 not only serves to drive the worm 32 but will actually turn the armature in the motor 36.

The motor 36 receives current from any suitable source depending upon the application of the invention. Where the invention is to be applied to an automobile, current for operating the motor 36 will be taken initially from the battery 53, Fig. 1, with a rheostat 54 included in the circuit for cutting off entirely the flow of current and varying it to the maximum flow as may be desired. In the initial application of power to the shaft 10 as above indicated, the driven shaft 13 remains stationary as do also the gear 15, gear 16, and gear 21. The worm wheel 31 revolves to carry the gears 30 bodily around between the stationary gear 16 and the wheel 18. Since the worm wheel 31 is turned in constant relation to the speed of the shaft 10 as long as the clutch interconnects the shafts 33 and 40, variations in the speed of the shaft 10 will be without effect on the driven shaft 13.

However, when the shaft 13 is to be set in motion by the shaft 10, the clutch blocks 42 are thrown outwardly by centrifugal force by bringing the speed of the shaft 10 up to that required for that result, the lever 45 having been shifted to permit that action. Simultaneously the motor 36 is interconnected with its source of current, the battery 53 in the present instance, so that the motor 36 then turns the worm wheel 31, the speed of the worm wheel then being controlled exclusively by the speed of the motor 36. A wide variation in speed ratios between the shaft 10 and the shaft 13 may be obtained by operating the motor 36 at a constant speed. This variation in ratio as the shaft 33 is disconnected from the shaft 40 and the motor 36 is controlling, is then obtained simply by varying the speed of the shaft 10. For example, by increasing the speed of the shaft 10, holding the motor 36 at a constant speed, the shaft 13 is stepped up in speed to a greater degree or number of revolutions in proportion to the increase in speed of the shaft 10. This will hold true through quite a range of increases in the speed of the shaft 10. A further variation in the actual speed ratios between the shaft 10 and the shaft 13 is obtained by varying the speed of the motor 36 through the rheostat 54 which causes a variation in speed of course of the worm wheel 31 and therefore a variation between the wheel 18 and the gear 16.

In any event the invention fundamentally comprises a pair of differential gears wherein the pinion gears of one set are bodily shifted around the driving axis with either a constant or variable speed. While the invention has been more or less minutely described in the one particular form as shown in Figs. 1–5, it may equally as well be embodied in the modified form as shown in Fig. 6. In this form, the driving shaft 10 is fixed to the bevel gear 12 to have the differential pinion gears 20 in constant mesh with the gear 12 and the opposing gear 55. In this case, however, the opposing bevel gear 55 is fixed to the driven shaft 13 directly. On the extended arms of the spider 19 is carried the spur gear 21 as in the first form. This spur gear 21 is in constant mesh with a spur gear 56 which drives in fixed relation thereto the bevel gear 57, being in the present form an integral part thereof. Between the bevel gear 57 and an opposing like bevel gear 58, are mounted pinion gears 59 in constant mesh therebetween to have an encircling worm wheel 60 concentrically around the spider carrying those gears 59. The worm wheel 60 is in constant mesh with a worm 32 which is operated in exactly the same manner as in the form shown in Figs. 1–5 to be selectively driven either from the power shaft 10 or from the electric motor 36 as above described. The worm 32 in any event operates as a governor or control of the speed of the worm wheel 60 and does not contribute nor subtract from the power transmitted in the shaft 10 to the shaft 13.

Further, in the form shown in Fig. 6, the bevel gear 58 is carried in fixed driving relation with a pinion gear 61, herein shown as being an integral part thereof. The gear 61 in turn is in constant mesh with an intermediate gear 62 which in turn is in constant mesh with a gear 63 mounted on and fixed to the driven shaft 13. In this modified form, the two differentials are employed as before, the governor being applied to one set as in the first form described.

While I have herein shown and described my invention in the best form as now known to me, it is obvious that structural variations may be employed without departing from the spirit of the invention, and while the claims refer to "gears", that language is intended to include the equivalents thereof, and I therefore do not desire to be limited to that precise form beyond the limitations as may be imposed by the following claims.

I claim:

1. A transmission unit between a driving member and a driven member comprising a differential gearing, a second differential gearing, each of said gearings consisting of a pair of spaced apart differential gears with pinion gears constantly meshed therebetween, an annulus shiftable with the pinion gears relative to the gears of one differential, a second annulus shiftable with the pinion gears of the second differential gears, means for revolving one of said annuli, means operating said revolving means, a differential gear of one differential gearing being drivingly connected to said driving member, and a differential gear of the second differential gearing being drivingly connected to the driven member, said revolving means being formed to be operable during movement of the driving member, said operating means consisting of a power unit independent of said driving member, additional driving means interconnecting with said revolving means and said driving member, and disconnecting means between said revolving means and said driving member.

2. A transmission unit between a driving member and a driven member comprising a differential gearing, a second differential gearing, each of said gearings consisting of a pair of spaced apart differential gears with pinion gears constantly meshed therebetween, an annulus shiftable with the pinion gears relative to the gears of one differential, a second annulus shiftable with the pinion gears of the second differential gears, means for revolving one of said annuli, means operating said revolving means, a differential gear of one differential gearing being drivingly connected to said driving member, and a differential gear of the second differential gearing being drivingly connected to the driven member, said revolving means being formed to be operable during movement of the driving member and a driving connection between the annulus of the first differential gearing and said driven member.

3. A transmission unit between a driving member and a driven member comprising a differential gearing, a second differential gearing, each of said gearings consisting of a pair of spaced apart differential gears with pinion gears constantly meshed therebetween, an annulus shiftable with the pinion gears relative to the gears of one differential, a second annulus shiftable with the pinion gears of the second differential gears, means for revolving one of said annuli, means operating said revolving means, a differential gear of one differential gearing being drivingly connected to said driving member, and a differential gear of the second differential gearing being drivingly connected to the driven member, said revolving means being formed to be operable during movement of the driving member and a driving connection between the annulus of the first differential gearing and said driven member, said operating means being independent of said driving member.

4. A transmission unit between a driving member and a driven member comprising a differential gearing, a second differential gearing, each of said gearings consisting of a pair of spaced apart differential gears with pinion gears constantly meshed therebetween, an annulus shiftable with the pinion gears relative to the gears of one differential, a second annulus shiftable with the pinion gears of the second differential gears, means for revolving one of said annuli, means operating said revolving means, a differential gear of one differential gearing being drivingly connected to said driving member, and a differential gear of the second differential gearing being drivingly connected to the driven member, said revolving means being formed to be operable during movement of the driving member and a driving connection between the annulus of the first differential gearing and said driven member, said operating means being independent of said driving member, and means varying the speed of said operating means whereby said revolving means may revolve its connected annulus at different speeds.

5. A transmission unit between a driving member and a driven member comprising a differential gearing, a second differential gearing, each of said gearings consisting of a pair of spaced apart differential gears with pinion gears constantly meshed therebetween, an annulus shiftable with the pinion gears relative to the gears of one differential, a second annulus shiftable with the pinion gears of the second differential gears, means for revolving one of said annuli, means operating said revolving means, a differential gear of one differential gearing being drivingly connected to said driving member, and a differential gear of the second differential gearing being drivingly connected to the driven member, said revolving means being formed to be operable during movement of the driving member, and a driving connection between the annulus of the first differential gearing and said driven member, said operating means being independent of said driving member, and driving means selectively interconnected with said revolving means from said driving member.

6. A transmission unit between a driving member and a driven member comprising a differential gearing, a second differential gearing, each of said gearings consisting of a pair of spaced apart differential gears with pinion gears constantly meshed therebetween, an annulus shiftable with the pinion gears relative to the gears of one differential, a second annulus shiftable with the pinion gears of the second differential gears, means for revolving one of said annuli, means operating said revolving means, a differential gear of one differential gearing being drivingly connected to said driving member, and a differential gear of the second differential gearing being drivingly connected to the driven member, said revolving means being formed to be operable during movement of the driving member and a driving connection between the annulus of the first differential gearing and said driven member, said operating means being independent of said driving member, and driving means selectively interconnected with said revolving means from said driving member, and means automatically disconnecting said last driving means from said revolving means at predetermined speeds.

7. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member.

8. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member through said second differential gearing.

9. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member around said second differential gearing.

10. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member, said connection between the first annulus and the driven member being formed to have both annulus and member revolve in the opposite direction.

11. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member, said governing means comprising a power source for driving said second annulus independently of said driving member.

12. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member, said governing means comprising a power source for driving said second annulus independently of said driving member, a driving connection between said governing means and said driving member, and means automatically interrupting said last connection at predetermined speeds.

13. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member, said governing means comprising a power source for driving said second annulus independently of said driving member and means for varying the speed of said annulus.

14. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of second gearing bing drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member around said second differential gearing, and means incorporated in said driving connection between the second annulus and the driven member for causing both annulus and driven member to revolve in the opposite direction.

15. A transmission unit between a driving member and a driven member comprising a differential gearing, a second differential gearing, each of said gearings having spaced apart differential gears and pinion gears constantly meshed between each set of spaced apart differential gears, an annulus mounted to be revoluble in relation to one set of said differential gears by the pinion gears therebetween, a second annulus mounted to be revoluble in relation to the other set of differential gears by the pinion gears therebetween, one differential gear of the said first gearing being drivingly connected to said driving member, one differential gear of said second gearing being drivingly connected to said driven member, the other two differential gears being placed intermediate the gears thus connected and further drivingly interconnected, governing means interconnected with the second annulus whereby the speed of that annulus may be controlled, said annulus of the first gearing being drivingly connected with said driven member, said governing means comprising a power source for driving said second annulus independently of said driving member, a driving connection between said governing means and said driving member, and means automatically interrupting said last connection at predetermined speeds, said automatic means consisting of a centrifugally operated clutch.

CHALMER SCHLOSSER, Jr.